(12) United States Patent
Liu et al.

(10) Patent No.: US 7,625,544 B2
(45) Date of Patent: Dec. 1, 2009

(54) METHOD FOR MANUFACTURING CARBON NANOTUBES

(75) Inventors: Kai Liu, Beijing (CN); Kai-Li Jiang, Beijing (CN); Shou-Shan Fan, Beijing (CN)

(73) Assignees: Tsinghua University, Beijing (CN); Hon Hai Precisiion Industry Co., Ltd., Tu-Cheng, Taipei Hsien (TW)

( * ) Notice: Subject to any disclaimer, the term of this patent is extended or adjusted under 35 U.S.C. 154(b) by 528 days.

(21) Appl. No.: 11/484,396

(22) Filed: Jul. 11, 2006

(65) Prior Publication Data
US 2009/0272490 A1    Nov. 5, 2009

(51) Int. Cl.
*D01C 5/00*    (2006.01)
(52) U.S. Cl. .................. 423/447.3; 423/447.5
(58) Field of Classification Search ............... 423/447.3, 423/447.5
See application file for complete search history.

(56) References Cited

U.S. PATENT DOCUMENTS

| | | | |
|---|---|---|---|
| 5,641,466 A | | 6/1997 | Ebbesen et al. |
| 6,090,363 A | | 7/2000 | Green et al. |
| 2003/0143398 A1* | | 7/2003 | Ohki et al. .................. 428/398 |
| 2004/0265210 A1* | | 12/2004 | Shinohara et al. ........ 423/447.3 |
| 2005/0074392 A1* | | 4/2005 | Yang et al. ............... 423/447.3 |

FOREIGN PATENT DOCUMENTS

| | | |
|---|---|---|
| TW | 200407260 | 5/2004 |
| TW | 593730 | 6/2004 |

OTHER PUBLICATIONS

W. Z. Li; Large-scale Synthesis of Aligned Carbon Nanotubes; pp. 1701-1703, vol. 274, Science 1996.
Shoushan Fan, Michael G. Chapline, Nathan R. Franklin, Thomas W. Tombler, Alan M. Cassell, and Hongjie Dai; Self-Oriented Regular Arrays of Carbon Nanotubes and Their Emission Properties; pp. 512-514, vol. 283, Science 1999.
Zheng-Wei Pan, Bao-He Chang, Lian-Feng Sun, Lu-Xi Qian, Zu-Qin Liu, Dong-Sheng Tang. Gang Wang and Si-Shen Xie, "The Preparation of Very Long, Opening Aligned Carbon Nanotube Arrays". Science in China (Series A), Aug. 1999, vol. 29, Issue 8, pp. 743-749, China.

* cited by examiner

*Primary Examiner*—Edward M Johnson
(74) *Attorney, Agent, or Firm*—Clifford O. Chi

(57) ABSTRACT

A method for manufacturing open-ended carbon nanotubes is described. The method includes steps of: providing a substrate having a catalyst layer formed thereon; placing the substrate in a reaction chamber; introducing a carbon source gas containing carbon element into the reaction chamber for growing carbon nanotubes form the catalyst layer; promptly reducing a concentration of the carbon source gas when the growth of carbon nanotubes in process, thereby ceasing the growth of the carbon nanotubes instantly; and separating the carbon nanotubes from the catalyst layer.

20 Claims, 3 Drawing Sheets

METHOD FOR MANUFACTURING CARBON NANOTUBES

RELATED APPLICATIONS

This application is related to commonly-assigned applications entitled, "CARBON NANOTUBE ARRAYS AND MANUFACTURING METHODS THEREOF", filed on Apr. 14, 2006 (U.S. patent application Ser. No. 11/404,523), "DEVICES FOR MANUFACTURING CARBON NANOTUBE ARRAYS", filed on Apr. 14, 2006 (U.S. patent application Ser. No. 11/404,522) and "METHODS FOR MEASURING GROWTH RATES OF CARBON NANOTUBES", filed on Apr. 14, 2006 (U.S. patent application Ser. No. 11/404,700), the content of each of which is hereby incorporated by reference.

BACKGROUND

1. Field of the Invention

The invention relates generally to methods for making carbon nanotubes and, more particularly, to a method for manufacturing carbon nanotubes with open-ended structure.

2. Discussion of Related Art

Carbon nanotubes (also herein referred to as CNTs) were first observed and reported in an article by Iijima in 1991 (Nature, Vol. 354, Nov. 7, 1991, pp. 56-58). Typically, carbon nanotubes are very small tube-shaped structures essentially having a composition of a graphite sheet in a tubular form. Carbon nanotubes have interesting and potentially useful electrical and mechanical properties and offer potential for various uses in electronic devices. Carbon nanotubes also feature extremely high electrical conductivity, very small diameters (much less than 100 nanometers), large aspect ratios (i.e. length/diameter ratios) (greater than 1000), and a tip-surface area near the theoretical limit (the smaller the tip-surface area, the more concentrated the electric field, and the greater the field enhancement factor). These features make carbon nanotubes ideal candidates for electron field emitters, light sources, lithium secondary batteries, hydrogen storage cells, transistors, and cathode ray tubes (CRTs).

Generally, carbon nanotubes can be classified into single-wall type and multi-wall type. A single-wall type carbon nanotube structure is composed of only one cylindrical graphitic layer. A multi-wall type carbon nanotube structure is composed of two or more nested cylindrical graphitic layers.

It is already known that, there are three methods for manufacturing carbon nanotubes. The first method is the arc discharge method, which was first discovered and reported in an article by Sumio Iijima, entitled "Helical Microtubules of Graphitic Carbon" (Nature, Vol. 354, Nov. 7, 1991, pp. 56-58). Carbon nanotubes produced by the arc discharge method are generally single-wall type. The second method is the laser ablation method, which was reported in an article by T. W. Ebbesen et al., entitled "Large-scale Synthesis of Carbon Nanotubes" (Nature, Vol. 358, 1992, pp. 220). This method has a low yield and is difficult to control a length and a diameter of the resulted carbon nanotubes. The third method is the chemical vapor deposition (CVD) method, which was reported in an article by W. Z. Li, entitled "Large-scale Synthesis of Aligned Carbon Nanotubes" (Science, Vol. 274, 1996, pp. 1701). The CVD method is useful in synthesis of carbon nanotube array and is advantageous in mass production, improved length controllability, compatibility with conventional integrated circuit process, etc.

Carbon nanotubes may have two terminal morphologies, i.e., close-ended structure and open-ended structure. The close-ended carbon nanotubes have a terminal/tip capped with a fullerene semi-sphere. The open-ended carbon nanotubes have an uncovered terminal/tip with an internal cavity exposed. However, carbon nanotubes produced by conventional CVD methods are generally close-ended structure. In order to improve a field emission properties, or if it is intended to incorporate some substance into inner spaces of close-ended carbon nanotubes, the tips thereof must be removed or uncovered. Conventionally, an additional process, e.g., oxidation using an oxidative acid solution, is needed to remove the capped tips. However, the oxidation process not only removes the capped tips but also oxidizes (burns) the nanotubes in a wide range thereby the peculiar nanotube structure may be damaged or even destroyed.

What is needed, therefore, is a method for manufacturing carbon nanotubes with open-ended structures without damages to their particular nanotube structure.

SUMMARY

In one embodiment, a method for manufacturing carbon nanotubes includes steps of: providing a substrate having a catalyst layer formed thereon; placing the substrate in a reaction chamber; introducing a carbon source gas containing carbon element into the reaction chamber for growing carbon nanotubes from the catalyst layer; promptly reducing a concentration of the carbon source gas proximate the catalyst layer when the growth of carbon nanotubes in process, thereby ceasing the growth of the carbon nanotubes instantly; and separating the carbon nanotubes from the catalyst layer. The carbon source gas includes hydrocarbon gases. The concentration of the carbon source gas is preferably decreased to less than 1% by volume within 10 seconds. That the promptly reducing the concentration of the carbon source gas terminates the carbon nanotubes growth process quickly, and thus prevents catalyst particles from being fully embedded inside the carbon nanotubes and can be separated from the carbon nanotubes readily without causing damage to the nanotube structure.

Other advantages and novel features of the present method will become more apparent from the following detailed description of preferred embodiments when taken in conjunction with the accompanying drawings.

BRIEF DESCRIPTION OF THE DRAWINGS

Many aspects of the present method can be better understood with reference to the following drawings. The components in the drawings are not necessarily to scale, the emphasis instead being placed upon clearly illustrating the principles of the present method.

DETAILED DESCRIPTION OF PREFERRED EMBODIMENTS

Reference will now be made to the drawings to describe embodiments of the present method in detail.

Figure 1:
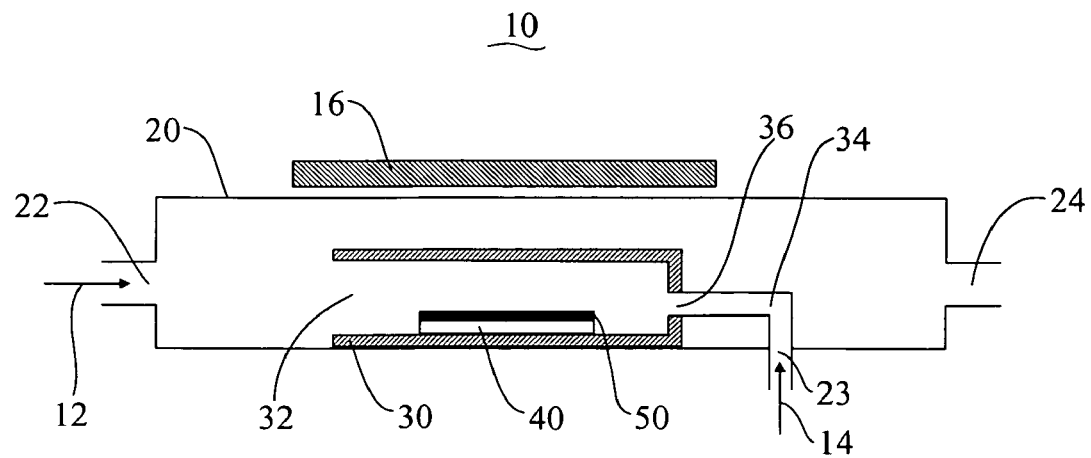
FIG. 1 is a schematic, side view of a device prepared to practice a method for making carbon nanotubes according to an exemplary embodiment.

FIG. 1 is a schematic, side view of an apparatus 10 prepared to practice a method for manufacturing carbon nanotubes according to an exemplary embodiment. As shown in FIG. 1, the device 10 includes a reaction furnace 20, a gas introducing tube 34, a supporting component (i.e., quartz boat) 30, and a heating device 16. The reaction furnace 20 is a tubular container and is made of high-temperature resistant material having steady chemical properties (e.g., quartz, alumina, or another high-temperature resistant ceramic). The reaction furnace 20 includes a first gas inlet 22, a second gas inlet 23 and a gas outlet 24. The first gas inlet 22 extends through one end of the reaction furnace 20, the gas outlet 24 extends through the other opposite end of the reaction furnace 20, and the second gas inlet 23 extends through one side of the reaction furnace 20. The first gas inlet 22 is used to introduce a reaction gas 12.

The quartz boat 30 is disposed in the reaction chamber 20. The quartz boat 30 is used to carry a substrate 40 thereon. The quartz boat 30 is semi-closed, and has one opening 32 and one closed end (not labeled) opposite to the opening 32. The opening 32 faces the gas inlet 22. Alternatively, the quartz boat 30 can be cymbiform (i.e., boat-shaped), tabular/planar, and so on. The gas introducing tube 34 is generally made of high-temperature resistant material having steady chemical properties (e.g., quartz, alumina, or another high-temperature resistant ceramic). The gas introducing tube 34 includes a first end (not labeled) connected to the second gas inlet 23 and a second end 36, advantageously, connected to the quartz boat 30. The second end 36 of the gas introducing tube 34 runs through the closed end of the quartz boat 30 and is aimed at the substrate 40. The gas introducing tube 34 is used to transport a disturbance gas 14, introduced from the second gas inlet to the quartz boat 30. The second end 36 of the gas introducing tube 34 is positioned sufficiently proximate to the substrate 40, carried by the quartz boat 30, for effectively delivering the disturbance gas 14 thereto. It is understood that the quartz boat 30 could potentially be made of another relatively inert, high-temperature resistant ceramic (e.g., alumina).

An exemplary method for manufacturing the carbon nanotubes includes the following steps: (a) providing a substrate having a catalyst layer formed thereon; (b) placing the substrate in a reaction chamber; (c) growing carbon nanotubes from the catalyst layer in the presence of a carbon source gas in the reaction chamber; (d) promptly reducing a concentration of the carbon source gas when the growth of carbon nanotubes in process thereby ceasing the growth of the carbon nanotubes instantly; and (e) removing the carbon nanotubes from the catalyst layer.

As an example, the present method may be practiced using the apparatus 10. A detailed description for practicing the present method employing the apparatus 10 is described in the following.

In step (a), a substrate 40 having a catalyst layer 50 disposed thereon is provided. The substrate 40 may be made of high-temperature resistant material having steady chemical properties, such as glass, quartz, silicon, or magnesia. The catalyst layer 50 is uniformly disposed on the substrate 40 by means of, e.g., chemical vapor deposition, thermal deposition, electron-beam deposition, or sputtering. It is noted that the catalyst layer 50 may be composed of catalyst material in powder form or in thin film. A thickness of the catalyst layer 50 is in the approximate range from 1 nanometer to 10 nanometers. The catalyst material can be iron (Fe), cobalt (Co), nickel (Ni), alloys thereof, or oxides including Fe, Co, and/or Ni. In the preferred embodiment, the catalyst layer 50 is made of iron (Fe) thin film. A thickness of the iron thin film is in the approximate range from 3 nanometers to 5 nanometers. Preferably, the catalyst layer 50 is annealed at an approximate temperature in the range from 200° C. to 400° C. This is beneficial to obtain iron particles. The iron particles tend to enhance the catalysis.

Then, the substrate 40, with the iron thin film disposed thereon, is placed in the quartz boat 30. Advantageously, the substrate 40, with the catalyst layer 50 disposed thereon, is disposed adjacent to the second end 36 of the gas introducing tube 34. This arrangement facilitates the disturbance gas 14 transported through the gas introducing tube 34 promptly spreading to the catalyst layer 50 in the subsequence step.

In step (c), carbon nanotubes are grown from the catalyst layer 50 in the presence of a carbon source gas by a chemical vapor deposition method. The carbon source gas is a hydrocarbon gas, e.g., ethylene ($C_2H_4$), methane ($CH_4$), acetylene ($C_2H_2$), or ethane ($C_2H_6$). In the present embodiment, carbon nanotubes growth is based on the pyrolysis of the carbon source gas in a reaction temperature approximately in the range from 500° C. to 900° C. For example, this step may include following substeps: (a) introducing a protection gas into the quartz boat 30 from the first gas inlet 22, thereby dispelling the air gas inside the quartz boat 30; (b) heating the quartz boat 30 to a predetermined reaction temperature by the heating device 16; (c) introducing the reaction gas 12 from the first gas inlet 22 into the quartz boat 30 for growing carbon nanotubes from the catalyst layer 50. The protection gas may be argon (Ar) gas, nitrogen ($N_2$) gas, hydrogen ($H_2$) gas, ammonia gas ($NH_3$) or other noble gases. The reaction gas 12 is the carbon source gas, or a mixture containing the carbon source gas and the protection gas. Preferably, the reaction temperature is in a range from 600° C. to 720° C., more preferably, in a range from 620° C. to 690° C.

In the above pyrolysis reaction, hydrocarbon gas is pyrolyzed into carbon element (C) and hydrogen element (H). The pyrolyzed carbon element is deposited on the catalyst layer 50 to form carbon nanotubes. A reaction time of the growth of carbon nanotubes may be 30 minutes to 60 minutes, depending on a desired length of the carbon nanotubes.

In step (d), the first gas inlet 22 is closed and the introduction of the reaction gas is switched off, thereby interrupting the flow of the reaction (i.e., carbon source) gas proximate the substrate 40. When the introduction of the reaction gas is switched off, a disturbance gas 14 is simultaneously introduced from the second gas inlet 23. The disturbance gas 14 is transported into the quartz boat 30 through the gas introducing tube 34. The disturbance gas 14 can be reductive gases and/or noble gases, such as argon (Ar) gas, nitrogen ($N_2$) gas, and hydrogen ($H_2$) gas. The disturbance gas can rapidly blow off the residual carbon source gas near the substrate 40, thus quickly ceasing the nanotube growth process. In this step, it is preferred to reduce the concentration of the carbon source gas to less than 1% by volume within approximate 10 seconds.

Figures 2A, 2B:
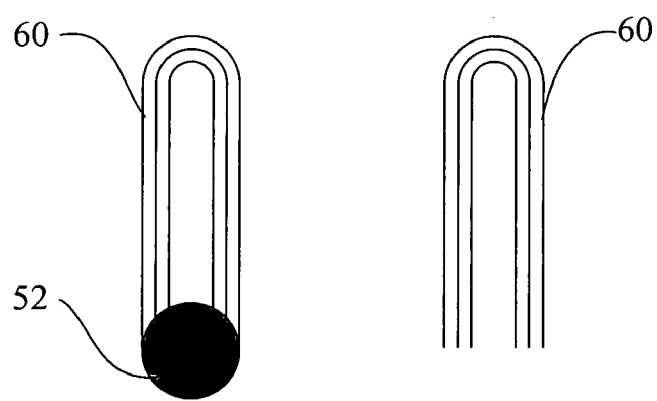
FIG. 2 is a schematic, side view showing a carbon nanotube having a catalytic particle attached on an end thereof (FIG. 2A) and the carbon nanotube with the catalytic particle removed therefrom (FIG. 2B)

The abruptly interruption of the nanotube growth process prevents the catalyst particles from being fully embedded inside of the carbon nanotubes, but only slightly attached to the carbon nanotubes. As shown in FIG. 2A, a catalyst particle 52 is partly contacted and attached to an end of a carbon nanotube 60. A bonding force between the catalyst particle 52 and the carbon nanotube 60 is relatively weaker compared with the conventional embedding structure.

In step (e), the catalyst particles can be readily separated from the carbon nanotubes by means of, e.g., ultrasonic surging. The ultrasonic surging does not damage the carbon nanotubes themselves. Thus, one end of each of the carbon nanotubes is exposed and the peculiar nanotube structure thereof is maintained intact. As shown in FIG. 2B, an open-ended carbon nanotube 60 is obtained, with the catalyst particle 52 separated therefrom.

Figure 3:
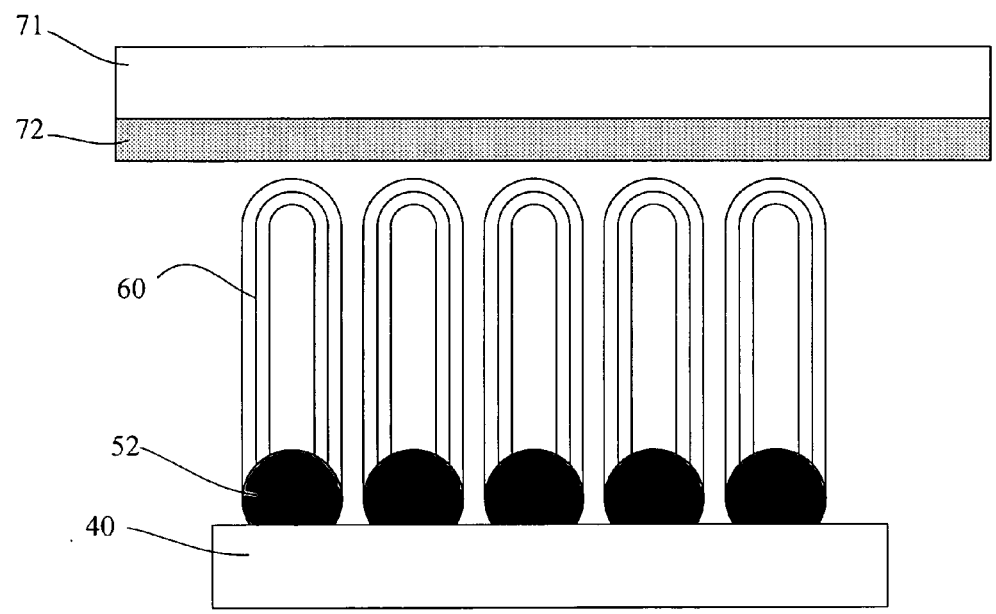
FIG. 3 is a schematic, side view showing an auxiliary plate having an adhesive layer used for separating carbon nanotubes from a substrate.

Alternatively, referring to FIG. 3, step (e) can be executed as follows. Firstly, an auxiliary plate 71 is prepared with an adhesive layer 72 coated thereon. The auxiliary plate 71 has a surface area greater than the substrate 40 and the adhesive layer 72 is coated on an entire surface thereof. Then, the auxiliary plate 71 is placed adjacent to a top of the carbon nanotubes 60 grown on the substrate 40, with the carbon nanotubes 60 adhering to the adhesive layer 71. Finally, the auxiliary plate 71, with the carbon nanotubes 60 adhered thereon, is pulled away from the substrate 40, thereby the carbon nanotubes 60 is separated from the catalyst particles 52.

Figure 4:
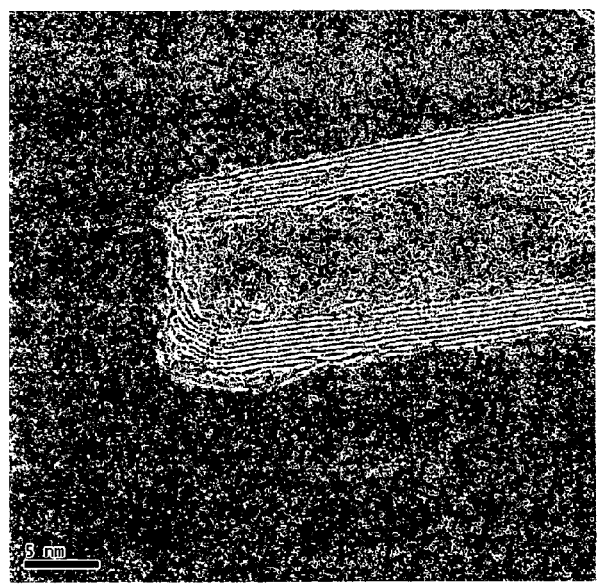
FIG. 4 is a TEM (Transmission Electron Microscopy) image of an open-ended carbon nanotubes according to an embodiment.
Figure 5:
FIG. 5 is another TEM image of carbon nanotubes according to another embodiment.

Referring to FIGS. 4 and 5, a high magnifying SEM image and a low magnifying SEM image of carbon nanotubes according to the present method are shown. One end of the carbon nanotubes are open and a length of the carbon nanotubes is in a range from tens to hundreds micrometers.

It is noted that the quartz boat 30 employed in the present exemplary embodiment does not limit to the structure described above. The second end 36 of the gas introducing tube 34 may extend through other portions of the quartz boat, provided that the disturbance gas can spread to the substrate 40 quickly and thus reduce the concentration of the carbon source gas.

Compared with the conventional CVD method, the present method can be used to manufacture the carbon nanotubes with an open-end. Furthermore, the carbon nanotubes produced by the present method maintain their intact nanotube structure and thus are prevented from damages that usually caused by oxidation in the conventional method.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. A method for manufacturing carbon nanotubes, comprising steps of:
   providing a substrate having a catalyst layer formed thereon;
   providing a semi-closed quartz boat carrying the substrate and placing the semi-closed quartz boat in a reaction chamber;
   providing gas introducing tube having an end running through the quartz boat;
   introducing a carbon source gas containing carbon element into the reaction chamber for growing carbon nanotubes from the catalyst layer;
   switching off the introducing of the carbon source gas and simultaneously introducing a disturbance gas from the gas introducing tube into the reaction chamber to promptly reduce a concentration of the carbon source gas proximate to the catalyst layer and blow the residual carbon source gas away from the catalyst layer, thereby ceasing the growth of the carbon nanotubes instantly to prevent catalyst particles in the catalyst layer from being fully embedded inside of the carbon nanotubes; and
   separating the carbon nanotubes from the catalyst layer.

2. The method as claimed in claim 1, wherein the carbon source gas comprises hydrocarbon gas.

3. The method as claimed in claim 1, wherein the reaction chamber is a quartz tube.

4. The method as claimed in claim 1, wherein the catalyst layer selected from the group consisting of iron, cobalt, nickel, alloys thereof, and oxides containing iron, cobalt, and nickel.

5. The method as claimed in claim 1, wherein the disturbance gas is selected from the group consisting of reductive gases and noble gases.

6. The method as claimed in claim 1, wherein the disturbance gas is selected from the group consisting of argon (Ar) gas, nitrogen ($N_2$) gas, and hydrogen ($H_2$) gas.

7. The method as claimed in claim 1, wherein the step of separating carbon nanotubes from the catalyst layer comprises ultrasonic surging.

8. The method as claimed in claim 1, wherein the step of separating carbon nanotubes from the catalyst layer comprises substeps of:
   providing an auxiliary plate having an adhesive layer coated thereon;
   adhering ends of the carbon nanotubes opposing the catalyst layer to the adhesive layer; and
   pulling away the auxiliary plate with the carbon nanotubes adhered thereto from the catalyst layer.

9. The method as claimed in claim 1, wherein the concentration of the carbon source gas is decreased to less than 1% by volume within approximately 10 seconds.

10. A method for manufacturing nanotubes, comprising steps of:
    placing a substrate with a catalyst layer formed thereon in a reaction chamber, wherein the reaction chamber comprises a first gas inlet extending through a lateral side of the reaction chamber and a gas outlet extending though another lateral side opposite to the gas inlet;
    placing a supporting member carrying the substrate in the bottom of the reaction chamber;
    placing a heating device located outside of the reaction chamber and adjacent to the top of the reaction chamber to heat the reaction chamber;
    introducing a reaction gas into the reaction chamber from the first gas inlet for a predetermined time for growing nanotubes from the catalyst layer;
    ceasing the introduction of the reaction gas and introducing a disturbance gas into the supporting member to promptly reduce a concentration of the carbon source gas and blow the residual carbon source gas away from the catalyst layer, to thereby cease the growth of the nanotubes instantly; and
    removing the catalyst layer from the nanotubes.

11. The method as claimed in claim 10, wherein the reaction chamber defines a second gas inlet at the bottom for introducing the disturbance gas.

12. The method as claimed in claim 11, wherein the supporting member is a semi-closed quartz boat with an open end facing the gas inlet and an opposing closed end communicating with the second inlet.

13. The method as claimed in claim 10, wherein the disturbance gas is comprised of a gas selected from the group consisting of reductive gases and inert gases.

14. The method as claimed in claim 10, wherein the reaction gas is a carbon source gas containing carbon.

15. The method as claimed in claim 1, wherein the end of the gas introducing tube is aimed at the substrate.

16. The method as claimed in claim 1, further comprising a step of providing a heating device outside of the reaction furnace, far away from and opposite to the substrate.

17. The method as claimed in claim 12, further providing a introducing tube comprising a first end connected to the second gas inlet and a second end connected to the quartz boat, wherein the second end runs through the closed end of the quartz boat, aiming at the substrate and proximate to the substrate.

18. The method as claimed in claim 10, wherein the step of separating carbon nanotubes from the catalyst layer comprises ultrasonic surging.

19. The method as claimed in claim 10, wherein the concentration of the carbon source gas is decreased to less than 1% by volume within approximately 10 seconds.

20. A method for manufacturing open-ended carbon nanotubes, comprising steps of:
   providing a reaction chamber;
   providing a quartz boat and a substrate in the reaction chamber, the substrate received in the quartz boat and having a catalyst layer, and the quartz boat having the first end and a second end opposite to the first end, the second end being aimed at the substrate and adjacent to the substrate;
   introducing a carbon source gas into the reaction chamber to grow carbon nanotubes from the catalyst layer;
   ceasing the introduction of the carbon source gas and introducing a disturbance gas from the second end into the quartz boat to promptly reduce a concentration of the carbon source gas proximate to the catalyst layer, thereby ceasing the growth of the carbon nanotubes instantly; and
   exerting an external force to separate the carbon nanotubes from the catalyst layer.

\* \* \* \* \*

UNITED STATES PATENT AND TRADEMARK OFFICE
CERTIFICATE OF CORRECTION

PATENT NO. : 7,625,544 B2 Page 1 of 1
APPLICATION NO. : 11/484396
DATED : December 1, 2009
INVENTOR(S) : Liu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 671 days.

Signed and Sealed this

Second Day of November, 2010

David J. Kappos
*Director of the United States Patent and Trademark Office*